United States Patent [19]

Bittner

[11] Patent Number: 4,838,117
[45] Date of Patent: Jun. 13, 1989

[54] CAMERA PANNER

[75] Inventor: Wilfried A. A. Bittner, Kowloon, Fed. Rep. of Germany

[73] Assignee: Maxwell Electronics Limited, Kowloon, Hong Kong

[21] Appl. No.: 88,258

[22] Filed: Aug. 24, 1987

[30] Foreign Application Priority Data

Aug. 26, 1986 [GB] United Kingdom ............... 8620625

[51] Int. Cl.⁴ ..................... F16H 37/14; F16H 55/22; F16M 11/12
[52] U.S. Cl. ............................. 74/665 C; 74/89.14; 74/425; 248/183
[58] Field of Search ............ 74/48, 89.14, 425, 665 C; 248/183, 278

[56] References Cited

U.S. PATENT DOCUMENTS

| | | | |
|---|---|---|---|
| 1,211,895 | 1/1917 | Theiss | 248/183 |
| 2,555,638 | 6/1951 | Fishter | 248/183 |
| 2,982,145 | 5/1961 | Orner | 74/424.8 R |
| 3,075,073 | 1/1963 | Hildebrecht | 74/89.15 |
| 3,469,469 | 9/1969 | Burger | 74/425 |
| 3,782,671 | 1/1974 | Igwe | 248/183 |
| 4,158,483 | 6/1979 | Fisher et al. | 74/89.14 |
| 4,663,635 | 5/1987 | Wu | 248/183 |
| 4,673,268 | 6/1987 | Wheeler et al. | 248/183 |

FOREIGN PATENT DOCUMENTS

| | | | |
|---|---|---|---|
| 1274350 | 8/1968 | Fed. Rep. of Germany | 248/183 |
| 2475671 | 8/1981 | France | 74/425 |
| 2538878 | 7/1984 | France | 248/183 |
| 38243 | 5/1922 | Norway | 74/48 |

Primary Examiner—Allan D. Herrmann
Attorney, Agent, or Firm—Morgan & Finnegan

[57] ABSTRACT

A panner for a camera or the like has a base on which is mounted a housing carrying a support for the camera or the like mounted above the housing. Drive means serve to rotate the housing relate to the base about a first axis so that the camera may be clamped about this axis. The support is pivotal above a second axis which is perpendicular to the first axis. An arm extends from the support into the housing and second drive means serve to reciprocate the end of the arm distal of the support and to rotate this support about the second axis.

11 Claims, 4 Drawing Sheets

CAMERA PANNER

INTRODUCTION

The present invention relates to a powered panner for movie and video cameras. Such panners may also be used with telescopes, binoculars, still cameras and the like.

In particular, the invention relates to a panner which is arranged to be mounted on a tripod, a camera or the like being mounted on the panner so that relative motion between the camera and tripod can be effected.

SUMMARY OF INVENTION

The invention provides a panner or the like, having a base, a housing mounted on the base, first drive means for rotating the housing relative to the base about a first axis, a support for the camera or the like mounted above the housing to pivot about a second axis perpendicular to the first axis, an arm extending from the support into the housing, and second drive means in the housing to reciprocate an end of the arm distal of the support to rotate the support about said second axis.

Preferably the arm has a bifurcated end and an eccentrically mounted pin is received in the bifurcated end and is reciprocated along an arc to reciprocate the arm.

Preferably the first drive means for rotating the housing relative to the base comprises an electric motor mounted on the housing or the base and arranged to rotate the housing relative to the base via a worm and wormwheel arrangement. By providing a worm and wormwheel with a sufficient gradient it is possible to prevent the wheel turning, unless it is driven by the worm. Preferably the worm and wormwheel are biassed towards one another to provide an intimate mesh between the teeth of the worm and wormwheel and hence reduce or eliminate backlash.

Preferably the electric motor has a shaft carrying a first worm which drives a wormwheel mounted fast with a second, larger worm which meshes with a final driven wormwheel.

Preferably the motor is mounted on a support which is removably attachable in the housing. The final drive wormwheel is rotatably mounted on a shaft journalled in the support and attached to the base and drivably connected to the shaft via a friction clutch.

Preferably means is provided to limit electrically the driving of the base relative to the housing by means of a plurality of electrical contacts which are provided to detect electrically the relative position of the housing and support.

Preferably the second drive means for reciprocating the pin, for moving the support, comprises a motor driven worm and wormwheel arrangement. The arrangement preferably comprising a worm on the motor shaft for driving a first wormwheel, a second, larger worm mounted fast with the first wormwheel and driving a second wormwheel.

Preferably a friction clutch is provided in the drive train between the support and housing and base and housing to allow manual adjustment of the relative positions.

Preferably in each worm and wormwheel arrangement the second worm is biassed towards the second wormwheel, preferably by means of a spring.

Preferably the housing houses a power supply for the motors and control circuitry.

Preferably means is provided for controlling remotely the electric motors. Means may also be provided to control one or both motors according to a predetermined program of operation, for example to rotate the support relative to the base through 30°, 60° or 90°.

Preferably a stop is provided to limit rotation of the support relative to the base, preferably to approximately 180°.

Other preferred features and advantages of the invention will be apparent from the following description.

DESCRIPTION OF PREFERRED EMBODIMENT

Figure 1:
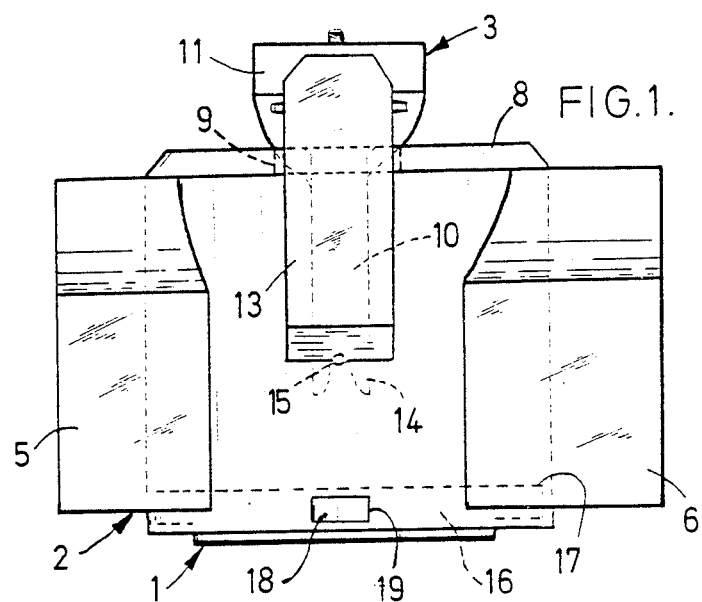
FIG. 1 is a schematic side view of a panner according to the invention.
Figure 2:
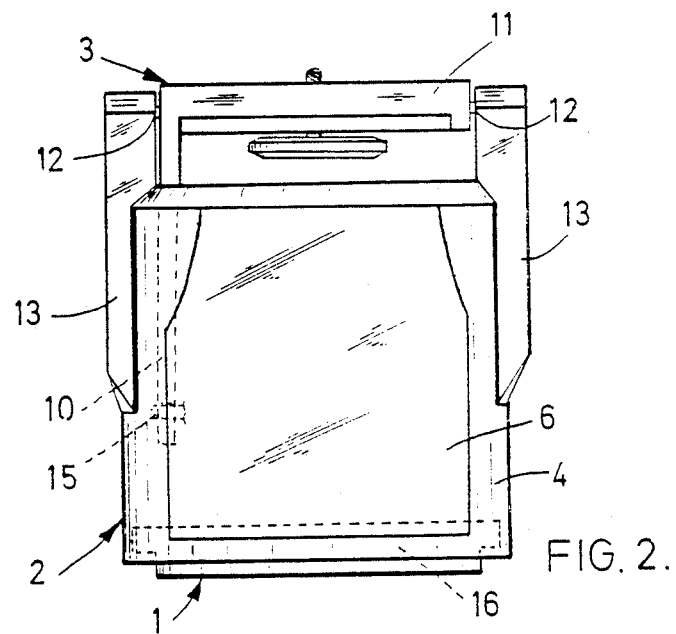
FIG. 2 is a schematic end view of the panner of FIG. 1.

FIG. 1 is a schematic side view of a panner according to the invention, comprising a base 1, housing 2 and camera support 3.

The housing 2 comprises a plastics, cylindrical inner portion 4 which houses drive motors for rotating the housing relative to the base 1, and tilting the support 3 relative to the housing. On opposite sides of the cylindrical portion 4 are integrally moulded plastics chambers 5, 6 for housing batteries to form a power supply and electronic controls respectively. The cylindrical portion 4 is closed at its upper end 8, save for a slot 9 which receives an arm 10 of the support 3.

Figure 5A:
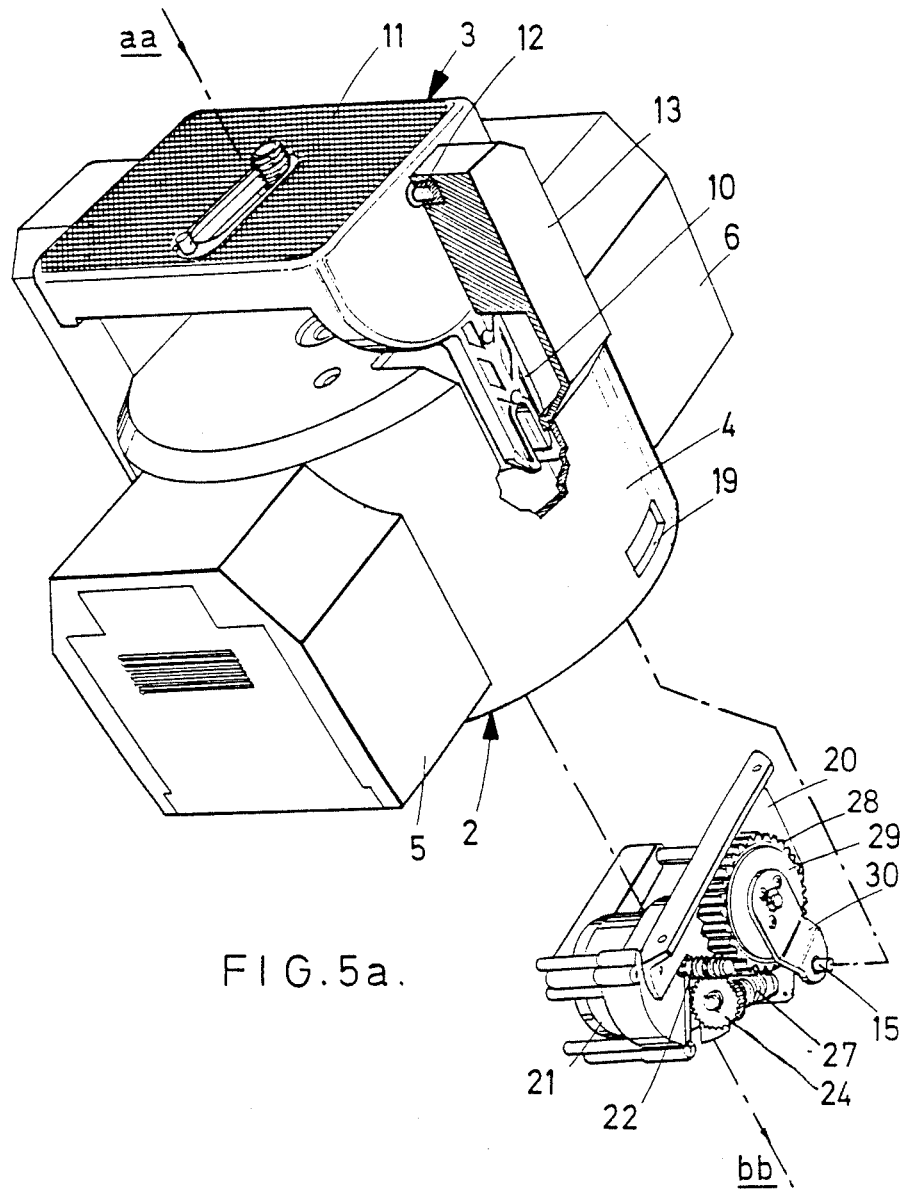
FIGS. 5a and 5b together show an exploded perspective view of the panner illustrating the assembly thereof.
Figure 5B:
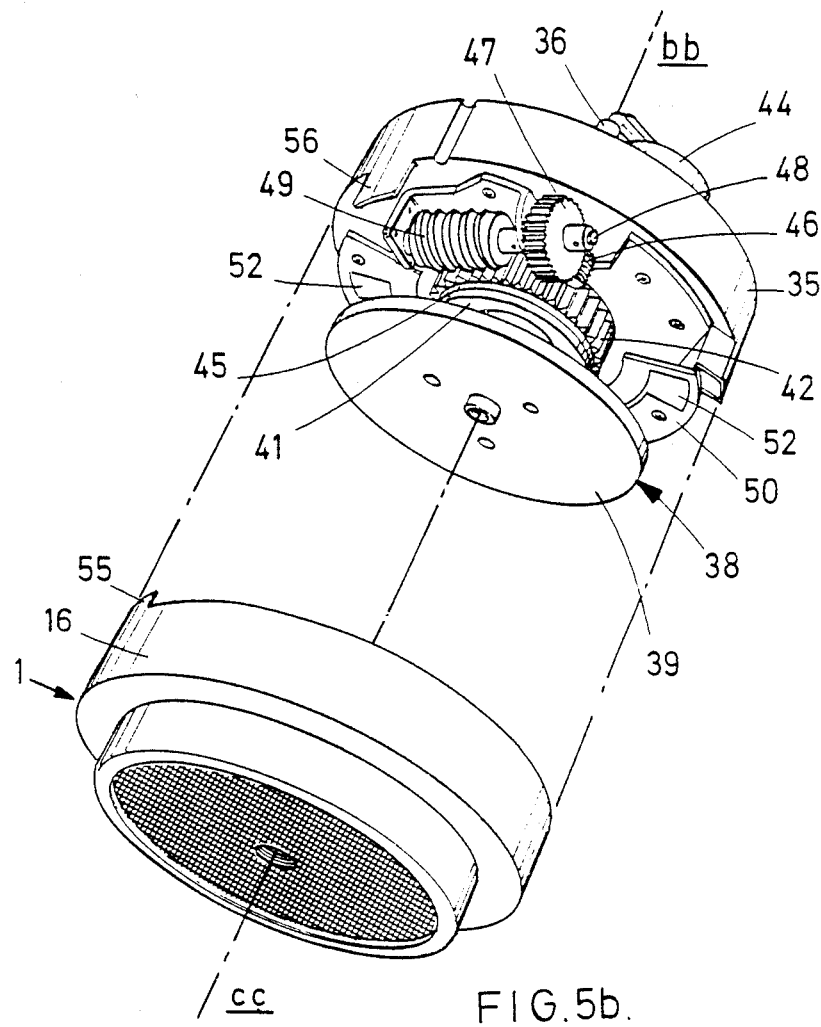

Support 3 comprises a platform 11 on which a camera, telescope etc. can be mounted. The platform 11 carries a screw (see FIG. 5a) for securing a camera to the platform as generally used on tripods, it may also carry a retractable pin (see FIG. 5a) for use in aligning cameras having an aperture for such a pin. Support 3 is pivotally mounted at each side on pins 12 which are fast in arms 13 which extend up from and are integrally formed with the cylindrical portion 4.

Arm 10 is integral with the platform 11 and extends down through slot 9 into the cylindrical portion 4. Arm 10 is bifurcated at its lower end 14 to receive a pin 15 which is reciprocated along an arc to reciprocate the end 14 of the arm 10 and hence to tilt the platform 11.

Preferably the platform is tiltable through an angle of + and −15 degrees from a mean position parallel to the base.

The base 1 comprises a moulded plastics cup 16 which is a close fit in the bottom of the cylindrical portion 4. Cup 16 carries means for mounting the base on a tripod or the like, as is commonly known. The base may of course simply be set on a flat surface. The cup has a top sidewall 17 which carries degree markings 18 which are visible through an aperture 19 in the wall of the cylindrical portion 4.

Means for driving the pin 15 to tilt the platform 11 and for rotating the housing relation to the base will now be described.

Figure 3:
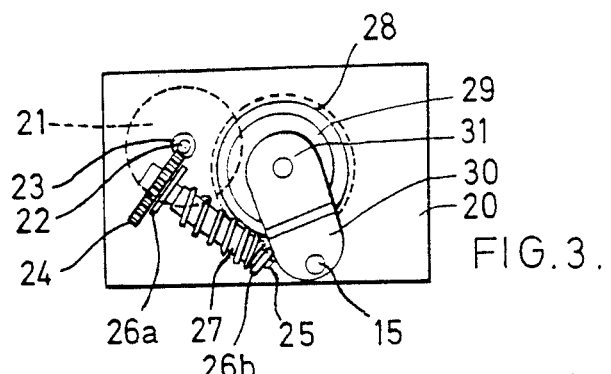
FIG. 3 is a schematic view not to scale, illustrating a drive mechanism for tilting a camera platform of the panner.

Referring to FIG. 3, a sheet metal back plate 20 carries a small, 6 volt permanent magnet direct current (PMDC) motor 21 which is mounted behind the plate. A shaft of the motor projects through an aperture 23 in the plate 20 and carries a worm 22 which meshes with a first wormwheel 24. Wormwheel 24 is mounted fast on a shaft 25 which rotates in two ears 26 which are pressed from the plate 20. Also fast on the shaft 25 is a second worm 27 which meshes with a final drive wormwheel 28. Mounted on wormwheel 28 is a circular plate 29 carrying an arm 30 which carries at its end the pin 15. Wormwheel 28 and plate 29 are rotatable on a central shaft 31. A wavy washer is located between the wormwheel 28 and plate 29 and compressed therebetween to form a friction clutch transmitting drive from the wormwheel 28 to the plate 29, but allowing slip between the wormwheel and plate under high load conditions, for example if the plate is tilted manually.

The motor 21 is driven in forward and reverse directions to reciprocate pin 15 through an arc and so reciprocate arm 10 and platform 11.

Worm 27 is biassed towards wormwheel 28 to ensure close meshing between the teeth of the wormwheel and tee worm avoiding backlash.

Figure 3A:
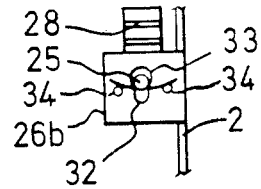
FIG. 3a is a detail of FIG. 3.

FIG. 3A is an end view of shaft 25 looking at ear 26b. Shaft 25 is carried in an oval or oblong hole 32 in ear 26b. A wire spring 33 is wound around shaft 25 and bears at its end on screws 34 which are secured into the ear 26b. Spring 33 thus urges the shaft 25 in the direction of worm 28. A degree of play is allowed where shaft 25 penetrates ear 26a to allow movement of the shaft 25 and so worm 27 towards the wormwheel 28.

The drive assembly of FIG. 3 is mounted by screws or the like to the undersurface of the top of cylindrical portion 4.

Figure 4:
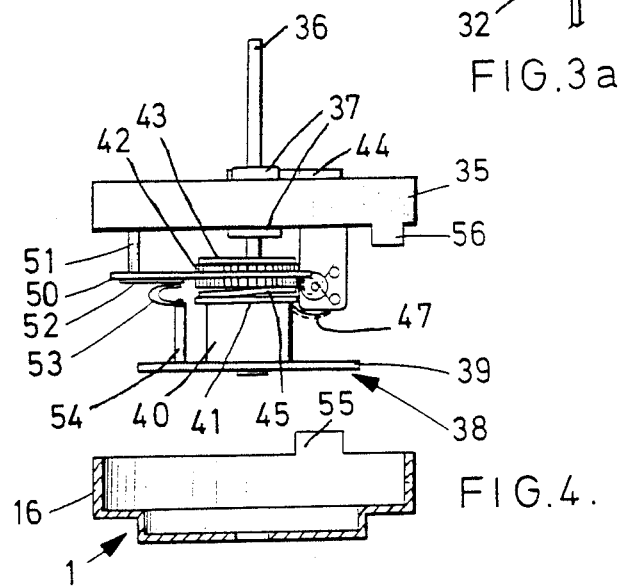
FIG. 4 is a schematic view not to scale illustrating a drive mechanism for rotating a housing of the panner relative to a base thereof.

FIG. 4 is a schematic partially exploded view of the means for rotating the base relative to the housing.

A plastics disc 35 is arranged to be a snug fit inside the cylindrical portion 4. Disc 35 is inserted from underneath the direction of base 4, and attached to abutments formed on the housing wall, for example by screws. A shaft 36 is journalled in disc 35 and held against axial movement by collars 37 which are attached to the shaft by grub screws.

At the bottom end of the shaft 36, a plate member 38 comprising a lower disc 39, cylinder 40 and middle disc 41 is mounted fast on the shaft.

Cylinder 40 is reduced in diameter at the level of disc 41 and extends up the shaft 36 to form a sleeve. An upper plate 43 is attached to the upper end of cylinder 40. A final driven wormwheel 42 and a friction clutch 45 in the form of a wavy washer are mounted on cylinders 40 between upper disc 43 and middle disc 41.

Wormwheel 42 is driven by a 6 V PMDC motor 44 carried by the disc 35 via a drive chain comprising a first worm 46 (mounted on the shaft of motor 44) which engages a wormwheel 47 mounted on the same shaft 48 as a second worm 49 which results with the wormwheel 42. This drive arrangement is identical in construction with that shown in FIG. 3 and, as in the arrangement of FIG. 3, includes spring means for biassing worm 49 towards wormwheel 42.

Accordingly, operation of the motor 44 rotates wormwheel 42 to rotate lower disc assembly 38 via the clutch 45. The clutch allows the disc assembly to be rotated without rotation of wormwheel 42 (which will not rotate as it is held by a worm).

Lower plate 39 is screwed to cup 16 to rotate the cup 16 relative to the disc 35, and hence the housing 2.

Also mounted on disc 35 are position sensing switches.

An arcuate plate 50 is carried on pillars 51 and has printed contacts 52 on its underside. A conducting leaf 53 is mounted on a metal pillar 54 on metal disc 39 and wipes over the contacts 52 as the disc 39 rotates. Electrical continuity between the plate 39 and a respective contact 52 can be detected to indicate the angular position of the plate relate to the disc 35.

A limit stop 55 projects up from the cup 16 and is arranged to abut stops 56 on disc 35, to limit mechanically the angular rotations of the cup and disc assembly 38 relative to disc 35.

To assemble the panner, the two drive assemblies of FIGS. 3 and 4 are constructed and the support 3 is attached to the housing 2. The drive assemblies are then inserted into cylindrical portion 4 and disc 35 attached to the housing by screws, access being had from the direction of plate 39. The cup 16, base 1, is then attached to the disc 39.

Wiring from the motors and the position detectors 52, 53 is fed through to compartment 6. Control switches may be mounted on the compartment and a socket provided for a lead wire to a remote control.

As indicated previously the circuitry may provide for various modes of operation: manual control via the remote control; automatic panning through predetermined angles such as 30°, 60°, 90°, by virtue of position switches 37, and automatic centering at 0°.

Various modifications will be apparent to those in the art and it is desired to include all such modifications as fall within the scope of the accompanying claims.

I claim:

1. An electrically operated panner for a camera or the like comprising a base, a housing mounted on said base, first and second drive means wholly contained within said housing, said first drive means comprising an electric motor including a motor shaft, said motor being fixed relative to said housing, a worm on said motor shaft, a first wormwheel in mesh with said worm, a second worm co-axial with and connected to said first wormwheel, a second wormwheel in mesh with said second worm, said second wormwheel being drivingly connected to said base and rotating said base relative to said housing about a first axis upon actuation of said motor; said second drive means comprising another electric motor including a motor shaft, said another motor being fixed relative to said housing, a worm on said motor shaft of said another motor, a first wormwheel in mesh with said worm, a second worm co-axial with and connected to said first wormwheel, a second wormwheel in mesh with said second worm, a first are eccentrically mounted on said second wormwheel which moves arcuately on rotation of said second wormwheel, a support for said camera or the like mounted above said housing and pivoting about a second axis perpendicular to said first axis; and a second arm extending from said support into said housing, the distal end of said second arm being drivingly connected to the distal end of said first arm and which upon actuation of said second drive means rotates said support about said second axis.

2. A panner as claimed in claim 1 wherein each worm is biassed towards a respective wormwheel.

3. A panner as claimed in claim 1 wherein a friction clutch is provided in the first drive means between the housing and the base.

4. A panner as claimed in claim 2 wherein a friction clutch is provided in the first drive means between the housing and the base.

5. A panner as claimed in claim 3 wherein the friction clutch comprises a wavy washer compressingly sandwiched between first and second plates, the first plate being drivingly connected to the second wormwheel of the first drive means and the second plate being drivingly connected to the base, whereby manual rotation of the base relative to the housing takes place without rotation of the second wormwheel.

6. A panner as claimed in claim 4 wherein the friction clutch comprises a wavy washer compressingly sandwiched between first and second plates, the first plate being drivingly connected to the second wormwheel of the first drive means and the second plate being drivingly connected to the base, whereby manual rotation of the base relative to the housing takes place without rotation of the second wormwheel.

7. A panner as claimed in claim 1 in which the first arm has a pin on the distal end thereof and the distal end of the second arm is bifurcated, the pin being located in the bifurcated end of said second are and drivingly connecting the second wormwheel of the second drive means to the distal end of said second arm.

8. A panner as claimed in claim 1 wherein the first drive means is mounted on a platform located in and attached to the housing, the electric motor of said first drive means being mounted about said platform, the first and second worms and first and second wormwheels being mounted below said platform, and the second drive means being mounted above said platform.

9. A panner as claimed in claim 1 wherein position sensing electrical contacts are provided for sensing when the base and housing reach predetermined relative positions.

10. A panner as claimed in claim 1 including remote control means for controlling remotely each drive means.

11. A panner as claimed in claim 1 including automatic control means for controlling the first drive means and the second drive means according to a present program.

* * * * *